US012403569B2

(12) United States Patent
Shen

(10) Patent No.: US 12,403,569 B2
(45) Date of Patent: Sep. 2, 2025

(54) WRENCH WITH WORK PIECE LOCKING MECHANISM

(71) Applicant: Apex Brands, Inc., Apex, NC (US)

(72) Inventor: Tsunghsien Shen, Situn District (TW)

(73) Assignee: APEX BRANDS, INC., Apex, NC (US)

( * ) Notice: Subject to any disclaimer, the term of this patent is extended or adjusted under 35 U.S.C. 154(b) by 256 days.

(21) Appl. No.: 17/918,368

(22) PCT Filed: Apr. 20, 2021

(86) PCT No.: PCT/US2021/028146
§ 371 (c)(1),
(2) Date: Oct. 12, 2022

(87) PCT Pub. No.: WO2021/221954
PCT Pub. Date: Nov. 4, 2021

(65) Prior Publication Data

US 2023/0139183 A1 May 4, 2023

Related U.S. Application Data

(60) Provisional application No. 63/017,936, filed on Apr. 30, 2020.

(51) Int. Cl.
*B25B 13/46* (2006.01)
*B25B 13/06* (2006.01)
*B25B 23/00* (2006.01)

(52) U.S. Cl.
CPC ............ *B25B 13/468* (2013.01); *B25B 13/06* (2013.01); *B25B 23/0035* (2013.01)

(58) Field of Classification Search
CPC ..... B25B 13/463; B25B 13/468; B25B 13/06; B25B 23/0035

(Continued)

(56) References Cited

U.S. PATENT DOCUMENTS 5,386,747 A * 2/1995 Grover ................ B25B 23/0035 81/177.85
6,044,730 A 4/2000 Roberts et al.
(Continued)

FOREIGN PATENT DOCUMENTS

CA 2264444 A1 9/1999
CN 205111698 U 3/2016
(Continued)

OTHER PUBLICATIONS

International Search Report and Written Opinion of corresponding International Application No. PCT/US2021/028146, mailed on Jul. 21, 2021, all enclosed pages cited herein.

(Continued)

*Primary Examiner* — Hadi Shakeri
(74) *Attorney, Agent, or Firm* — BURR & FORMAN

(57) ABSTRACT

A wrench may include a head, a drive tang that engages a work piece, a locking detent operably coupled to the drive tang, and a release button configured to control operation of the locking detent. The release button may be movable between a locked position where the locking detent locks the work piece to the drive tang and an unlocked position where the detent permits removal of the work piece from the drive tang. The wrench may also include a slide lock member configured to slide along a second direction between an engaged position and a disengaged position. In the engaged position, the slide lock member may prevent movement of the release button, and, in the disengaged position, the slide lock member may be disengaged from the release button to permit movement of the release button from the locked position to the unlocked position.

16 Claims, 11 Drawing Sheets

(58) Field of Classification Search
USPC .............................................................. 81/60
See application file for complete search history.

(56) References Cited

U.S. PATENT DOCUMENTS

| | | | | |
|---|---|---|---|---|
| 6,205,890 | B1 * | 3/2001 | Roberts | B25B 23/0035 81/177.85 |
| 6,752,046 | B1 * | 6/2004 | Lee | B25B 13/461 81/177.85 |
| 8,943,929 | B2 * | 2/2015 | Ou | B25B 13/463 81/60 |
| 9,205,538 | B2 * | 12/2015 | Yang | B25B 13/461 |
| 9,849,569 | B2 * | 12/2017 | Su | B25B 23/0071 |
| 2010/0132517 | A1 | 6/2010 | Crawford | |
| 2015/0246434 | A1 | 9/2015 | Shyu | |
| 2016/0229042 | A1 | 8/2016 | Shyu | |
| 2017/0190029 | A1 | 7/2017 | Cuesta | |

FOREIGN PATENT DOCUMENTS

| | | | |
|---|---|---|---|
| CN | 205111700 | U | 3/2016 |
| CN | 210210167 | U | 3/2020 |
| CN | 111070145 | A | 4/2020 |
| WO | 2002034474 | A1 | 5/2002 |

OTHER PUBLICATIONS

Chinese Office Action and Search Report (with English Translation) issued in corresponding Chinese Patent Application No. 202180031121.0 mailed Aug. 20, 2024, all pages cited in its entirety.
Second Office Action (with English Translation) issued in corresponding Chinese Patent Application No. 202180031121.0 on Mar. 3, 2025, all pages cited in its entirety.

* cited by examiner

WRENCH WITH WORK PIECE LOCKING MECHANISM

TECHNICAL FIELD

Example embodiments generally relate to hand tool technology, and in particular to coupling technologies for wrenches that engage with work pieces, such as, for example, sockets.

BACKGROUND

Wrenches, including ratchet wrenches, that have the ability to attach a drive tang to a variety of work pieces, such as sockets or bits, provide substantial application flexibly. For example, the same ratchet wrench may be attached to many different sockets to permit the single wrench to be utilized when installing or removing a variety of differently sized fasteners. However, the removable nature of such work pieces from the wrench creates a risk that the work piece could unintentionally be separated from the wrench. In this regard, for example, if a user is working at a height (e.g., on a ladder) or over a machine (e.g., over a car engine), the accidental and unintentional separation of the work piece from the wrench could lead to the work piece falling from the height and being lost, or falling into the machine and being difficult to retrieve. As such, there continues to be a need for new, secure and efficient mechanisms to prevent the accidental, unintentional separation of work pieces, such as sockets, from wrenches.

BRIEF SUMMARY OF SOME EXAMPLES

As such, according to some example embodiments, a ratchet wrench is provided. The ratchet wrench may comprise a head comprising a top face and a bottom face, and a drive tang that extends from the bottom face of the head. The drive tang may be shaped to engage a work piece. The ratchet wrench may further comprise a ratcheting mechanism disposed within a head cavity of the head and operably coupled to the drive tang. Additionally, the ratcheting mechanism may be configured to permit the drive tang to rotate relative to the head in a ratcheting rotational direction and prevent the drive tang from rotating relative to the head in a drive rotational direction. The ratchet wrench may further comprise a locking detent operably coupled to the drive tang, and a release button disposed on a top face of the head and configured to control operation of the locking detent. The release button may be movable along a first direction between a locked position, where the locking detent locks the work piece to the drive tang, and an unlocked position where the detent permits removal of the work piece from the drive tang. The ratchet wrench may further comprise a slide lock member configured to slide along a second direction between an engaged position and a disengaged position. In this regard, the second direction may be perpendicular to the first direction. Additionally, in the engaged position, the slide lock member may engage with the release button to prevent movement of the release button in the first direction from the locked position to the unlocked position, and, in the disengaged position, the slide lock member may be disengaged from the release button to permit movement of the release button in the first direction to move from the locked position to the unlocked position.

According to some example embodiments, a wrench is provided. The wrench may comprise a head comprising a top face and a bottom face, and a drive tang that extends from the bottom face of the head. In this regard, the drive tang may be shaped to engage a work piece. The wrench may further comprise a locking detent operably coupled to the drive tang and a release button disposed on a top face of the head and configured to control operation of the locking detent. The release button may be movable along a first linear direction between a locked position where the locking detent locks the work piece to the drive tang and an unlocked position where the detent permits removal of the work piece from the drive tang. The wrench may further comprise a slide lock member configured to slide along a second linear direction between an engaged position and a disengaged position. In this regard, in the engaged position, the slide lock member may engage with the release button to prevent movement of the release button in the first linear direction from the locked position to the unlocked position, and, in the disengaged position, the slide lock member may be disengaged from the release button to permit movement of the release button in the first linear direction to move from the locked position to the unlocked position.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

DETAILED DESCRIPTION

Figure 1:
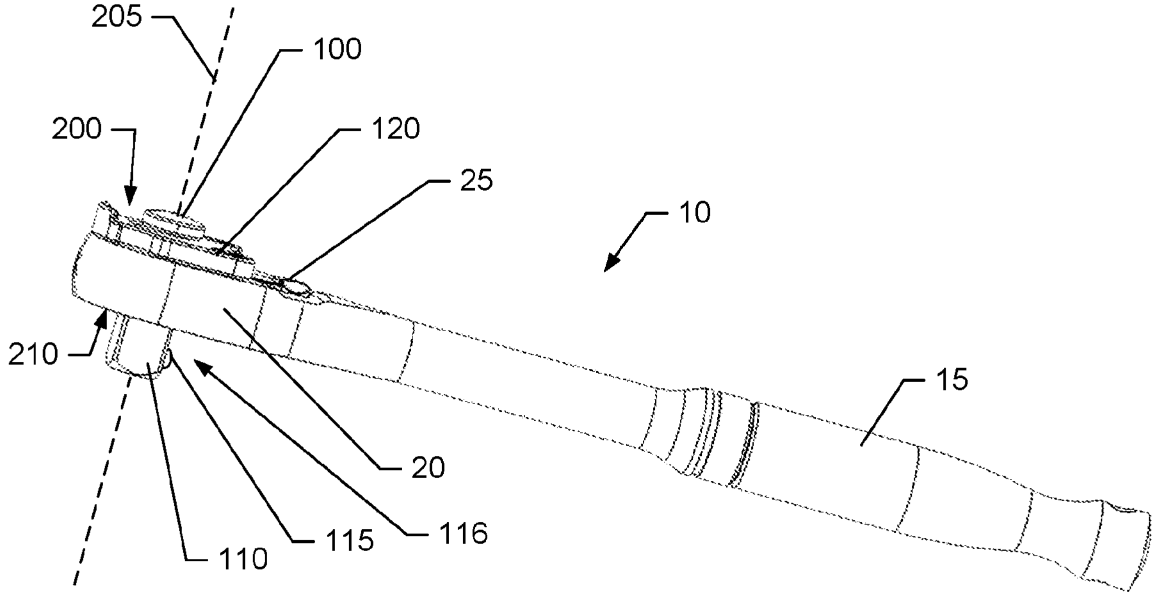
FIG. 1 illustrates a side view of a wrench according to some example embodiments.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other. As used herein, operable coupling should be understood to relate to direct or indirect connection that, in either case, enables functional interconnection of components that are operably coupled to each other.

According to various example embodiments, a wrench, such as a ratchet wrench, is provided with a work piece locking mechanism that is configured to avoid unintentional separation of a work piece from a drive tang of the wrench. As mentioned above, a work piece may be a socket, a bit, or the like that can be attached to a drive tang of a wrench to facilitate engagement of the wrench with a variety of fasteners. In this regard, the work piece locking mechanism may being configured to lock the work piece to the drive tang such that the work piece cannot be unintentionally removed from the drive tang by bumping or otherwise applying a force directly onto the work piece. In this regard, according to some example embodiments, the wrench may include a lockable detent that may engage and lock a work piece onto the drive tang. According to some example embodiments, a work piece may include a locking feature, such as an internal groove, that may engage with a locking member of the lockable detent that extends away from the drive tang to lock the work piece onto the drive tang.

To release the work piece from the drive tang of the wrench, a two-step or two-movement action may be required to be performed by the user on the wrench. In this regard, according to some example embodiments, a wrench may include a release button that can be depressed to control the lockable detent. The release button may operate to release the locking member, which may be a component of the locking detent, from the work piece to permit separation of the work piece from the wrench. In this regard, the release button may be actuated between a locked position, where the locking member is in locked engagement with the work piece, and an unlocked position, where the locking member may be disengaged from the work piece and separated from the wrench. Actuation of the release button may occur along a locking direction in a linear path.

Additionally, the wrench may comprise a slide lock member that selectively engages with the release button to affect the release button's ability to move. In this regard, the slide lock member may be movable, along an engagement direction, between an engaged position, where the slide lock member is engaged with the release button, and a disengaged position, where the slide lock member is not engaged with the release button. Accordingly, when the slide lock member is engaged with the release button, the release button may be prevented from moving into the unlocked position, and, when the slide lock member is in the disengaged position, the release button may be permitted to move into the unlocked position.

To separate a work piece from a drive tang of a wrench, according to some example embodiments, a user may be required to first move the slide lock member from the engaged position to the disengaged position along a first (engagement) direction, as a first step or first movement, which may be a linear movement. Subsequently, the user may be required, while the slide lock member is maintained in the disengaged position, to press the release button to move the release button along a second (locking) direction from the locked position to the unlocked position, which also may be a linear movement and may be perpendicular to the movement of the slide lock member. Upon moving the release button into the unlocked position (no longer being obstructed or encumbered by the slide lock member due to the slide lock member being in the disengaged position), the locking member may be permitted to disengage from the work piece, to permit the work piece to the separated from the drive tang.

The two-step or two-movement operation performed by the user to separate the work piece from the wrench may require, according to some example embodiments, movements by the user that are liner in different directions, such as in perpendicular directions. Such sequenced, movements are very unlikely to occur unintentionally. As such, by requiring a two-step or two-movement operation by the user to unlock a work piece, it is very unlikely that a work piece may be accidentally separated from a wrench without a user intending for the work piece to be removed from wrench. Accordingly, the collaborative operation of the slide lock member with the release button may provide a secure and efficient approach for controlling the removal or separation of a work piece, such as a socket or a bit, from the drive tang of a wrench, according to some example embodiments.

Having described some aspects of some example embodiments in a general sense, FIG. 1 provides an example embodiment in the form of an example ratchet wrench 10. Although the example embodiments may be described with respect to a ratcheting wrench 10, it is understood that some example embodiments may be applicable to, for example, other non-ratcheting wrenches. In this regard, the wrench 10 may be configured to ratchet in a first rotational direction about an axis 205 or apply a torque to, for example, a fastener (e.g., a bolt, a nut, or the like) in a second, opposite, rotational direction, based on a position of an reversing lever 25 of the wrench and a direction of rotation applied by a user. As such, the wrench 10 may be configured to permit a user to apply torque on a fastener in either a clockwise or counterclockwise manner, with an ability to ratchet in an opposite direction of rotation based on the position of the reversing lever 25, which controls the positioning of other components wrench 10 that comprise a ratcheting mechanism of the wrench 10 to support such functionality. Due to the ratcheting feature, the wrench 10, may be particularly useful in confined areas that restrict movement by lessening or eliminating the need to reposition the wrench 10 on a fastener during a tightening or loosening operation.

In this regard, FIG. 1 shows wrench 10, according to some example embodiments, comprising a handle 15 and a head 20. The head 20 may be disposed on a forward portion of the wrench 10. The handle 15 may extend longitudinally away from the head 20 in a rearward direction to provide both a hand-grip and length from the rotational axis 205 of the wrench 10 to create wrench leverage for a user. According to some example embodiments, the handle 15 may be generally cylindrical in shape. The head 20 may have a top face 200 and a bottom face 210 for positional reference, where the top face 200 is opposite the bottom face 210 and the rotational axis 205 passes through the top face 200 and the bottom face 210. The head 20 may broaden in width as the head 20 extends away from the handle 15, and the head 20 may have a generally oval or ovoid shape. Within the head 20, the wrench 10 may include a reversing ratcheting mechanism as further described below disposed within a head cavity within the head 20. Various components of the wrench 10 may be formed or casted of metals, such as, for example steel or stainless steel.

Additionally, the head 20 may include, extending from the bottom face 210, a drive tang 110. The drive tang 110 may be configured to couple to a work piece, such as socket, bit, or the like. In this regard, the drive tang 110 may be shaped to, for example, be received into a cavity of the work piece. According to some example embodiments, the drive tang 110 have a square cross-sectional shape. The drive tang 110 may be coupled to the ratcheting mechanism such that the drive tang 110 is configured to ratchet relative to the head 20 in a first rotational direction and apply a torque moving with the head 20 in a second rotational direction. As further, described below, the drive tang 110 may have an internal cavity that houses a locking member 115, which may be a locking bearing. The locking member 115 may operate as a component of lockable detent 116 along with a locking member opening 112 in the drive tang 110. The locking member 115 may be configured to engage with a work piece to lock the work piece to the drive tang 110 and the wrench 10.

In this regard, the wrench 10 may also include a release button 100 disposed on the top face 200. The release button 100, according to some example embodiments, may be movable or depressible into the top face 200 of the wrench 10. The release button 100 may operate to control a locking mechanism and, more specifically, the locking detent 116 for locking the work piece to the drive tang 110 via the locking member 115 as further described below. In short, when the release button 100 is not being acted upon, the release button 100 may default into a locked position, where the locking member 115 is maintained in an extended position, which would be engaged with a work piece if the work piece is installed on the drive tang 110. However, the release button 100 may be depressed such that the release button 100 moves in a direction along or parallel the rotational axis 205 and into an unlocked position. When the release button 100 is disposed in the unlocked position, the locking member 115 may be permitted to move, for example, into the cavity in the drive tang 110, thereby allowing a work piece to be removed from the drive tang 110.

According to some example embodiments, wrench 10 may include a slide lock member 120 that operates in cooperation with the release button 100 to prevent the unintentional release or separation of a work piece form the drive tang 110. In this regard, according to some example embodiments, the slide lock member 120 may be disposed on the top face 200 of the wrench 10. Similar to the release button 100, the slide lock member 120 may be a moveable component. The slide lock member 120 may move, in a linear sliding fashion, on the top face 200 of the wrench 10 between an engaged position and a disengaged position. In the engaged position the slide lock member 120 may be in physical contact with the release button 100 in a manner that prevents the release button 100 from moving from the locked position to the unlocked position. Further, in the disengaged position, the slide lock member 120 may be disengaged from the release button 100, and the release button 100 may be permitted to the move from the locked position to the unlocked position.

Figure 2:
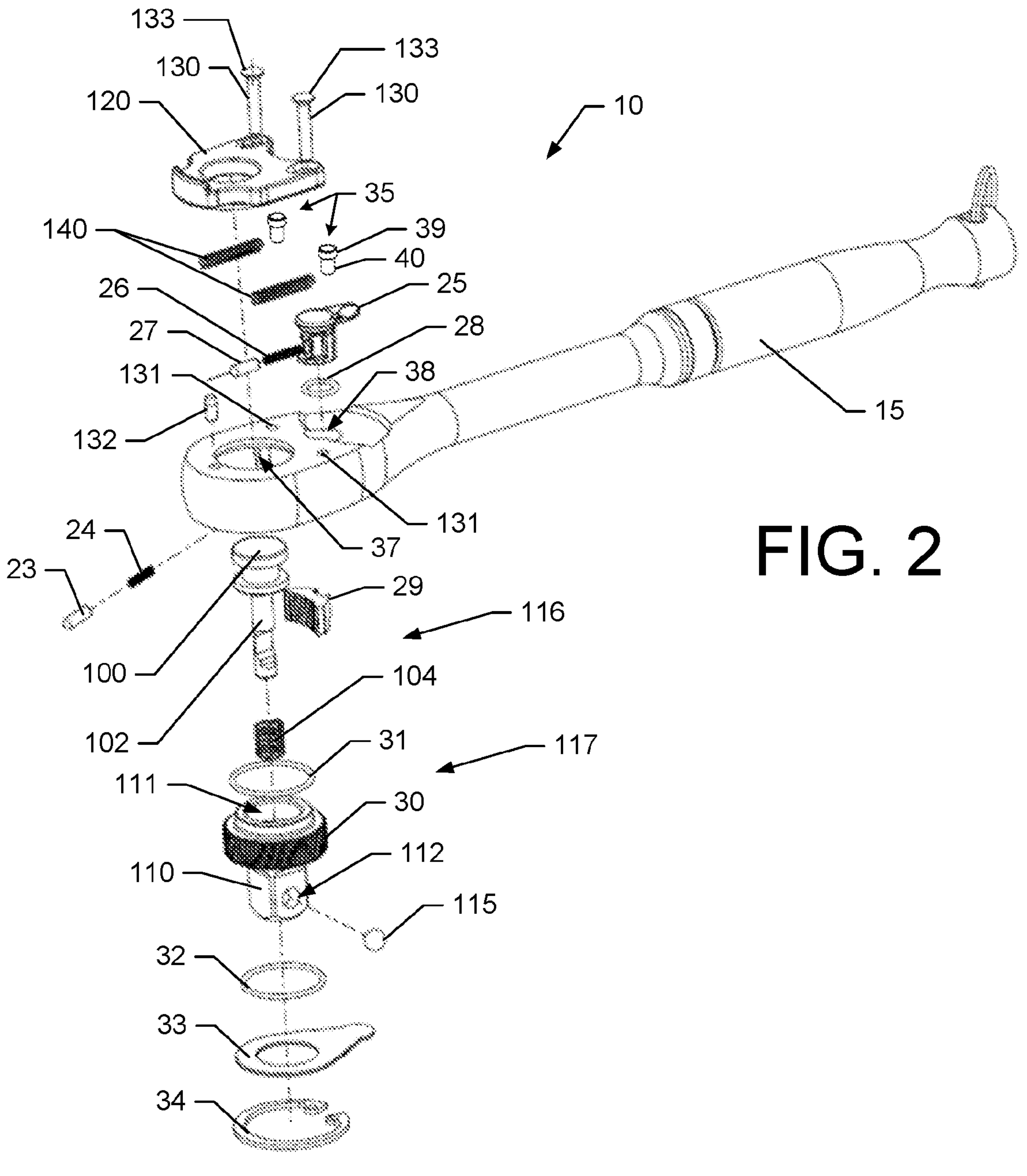
FIG. 2 illustrates an exploded view of a wrench according to some example embodiments.

Having described some of the external components of the wrench 10, according to some example embodiments, FIG. 2 provides an exploded view of the various example components of the wrench 10. In this regard, the wrench 10 may include a cover 33 that operates to maintain various components within a head cavity 37 of the head 20 and also protect internal components of the wrench 10 from dirt and debris. Accordingly, the cover 33 may be held in place by the locking ring 34, which may be temporarily deformed to facilitate being installed in a channel in the cavity 37 of the head 20 to maintain the cover 33 on or adjacent to the bottom face 210 of the head 20. The cover 33 may include an opening through which a drive tang 110 may pass and extend externally away from the head 20. As mentioned above and further described below, the work piece may be locked onto the drive tang 110 via a lockable detect 116. The lockable detent 116 may lock the work piece to the drive tang 110 through interaction with the lock member 115. In this regard, the drive tang 110 may have an locking member opening 112 on one of the surfaces of the drive tang 110. The locking member opening 112 may pass into a drive tang cavity 111. The locking member 115 may be disposed in the drive tang cavity 111 may, in some instances, extend out of the locking member opening 112. However, according to some example embodiments, locking member 115 may be too large to pass through the locking member opening 112, but may still, in some instances, partially extend out of the locking member opening 112.

The drive tang 110 may be coupled to or integrated with a gear 30 comprising ratchet teeth encircling a body of the gear 30 on an external circular face of the gear 30. The gear 30 may have a plurality of gear teeth 104 disposed about a circumference of the gear 30, and further the drive tang 110 may be axially disposed on a base of the gear. In this regard, the gear 30 may have a circular shape that is elongated into a cylinder to increase the engagement surface area of the teeth for engagement with teeth of the pawl 29 which facilitate the ratcheting operation of the wrench 10. To facilitate rotation of the gear 30 relative to the cover 33, a washer 32 may be included therebetween. Additionally, to facilitate rotation of the gear 30 relative to the internal upper surface of the head cavity 37, a washer 31 may be included therebetween.

As mentioned above, the pawl 29 may have teeth that are configured to engage with the teeth of the gear 30 to facilitate the ratcheting functionality of the wrench 10, thereby comprising components of the ratcheting mechanism 117 of the wrench 10. The pawl 29 may be disposed in the cavity 37 of the head 20. The pawl 29 may be configured to move within the cavity 37 to permit a change in the ratcheting direction of the wrench 10. In this regard, the reversing lever 25 may be configured to control the movement of the pawl 29 within the head 20, and thereby control the ratcheting direction of the wrench 10. The reversing lever 25, may be disposed within the opening 38 in the head 20 and may engage with the pawl 29 via a slug 27 that applies a force on the pawl 29 via the spring 26 that is disposed between a body portion of the reversing lever 25 and the slug 27. Additionally, to maintain the reversing lever 25 in a first position (e.g., for clockwise ratcheting) or a second position (e.g., for counter-clockwise ratcheting), a slug 23 may be engage with the body portion of the reversing lever 25. Via the spring 24, which is disposed between an internal surface of the cavity 37 and the slug 23, a biasing force may be applied to the body portion of the reversing lever 25 that causes the reversing lever 25 to "jump" into one of the first position or the second position as the reversing lever 25 is pivoted. To facilitate rotation of the reversing lever 25 relative the top face 200 of the head 20, a washer 28 maybe disposed therebetween.

The wrench 10 may also include the release button 100 which may be coupled or integrated with a post 102. The post 102 may extend through a top opening in the cavity 37 in the head 20 and form a portion of a lockable detent. The post 102 may extend from the bottom side of the release button 100 and may be disposed within a drive tang cavity 111 with the locking member 115. As further described below, the post 102 may include features that operate to control the movement of the locking member 115 in response to movement of the release button 100 between the locked and unlocked positions. To maintain the release button 100 in a position that extends above the top face 200 of the head 20, a release button spring 104 may urge the release button 100 into the extended, unlocked position. The release button spring 104 may be disposed within the drive tang cavity 111 and may be compressed between a ledge within the drive tang cavity 111 and a lower, spring lip of the release button 100.

According to some example embodiments, the slide lock member 120 and associated components may be disposed on a top face 200 of the head 20. The slide lock member 210 may be secured to the top face 200 of the head 20 by securing pins 130. The securing pins 130 may pass through securing pin openings in the slide lock member 120 and be secured (e.g., screwed) into pin holes 131 on the top face 200 of the head 20. The securing pins 130 may have heads that may engage with a upper surface of the slide lock member 120 to hold the slide lock member 120 on the top face 200 of the head 20. Additionally, a guide protrusion 132 may extend away from the top face 200 of the head 20 to engage a guide slot 127 (FIG. 3B) to guide the sliding movement of the slide lock member 120. Additionally, slide lock springs 140 may be may be disposed in spring slots 126 on the bottom side of the slide lock member 120 (FIG. 3B) and may be positioned between the securing pins 130 and an end of the spring slots 126 to urge the slide lock member 120 into the engaged position.

Figure 3A:
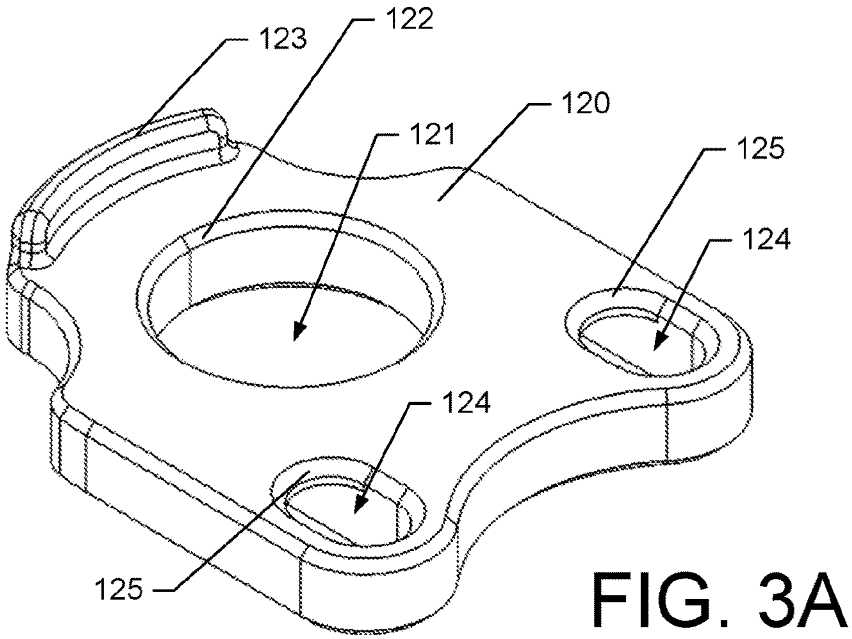
FIG. 3A illustrates a top perspective view of a slide lock member according to some example embodiments.

Having described the various individual components of the wrench 10, FIGS. 3A-3C will now be described which focus on the aspects of the slide lock member 120 and the securing pins 130. In this regard, with reference to FIG. 3A, a perspective top view of the slide lock member 120, according to some example embodiments, is provided. According to some example embodiments, the slide lock member 120 is formed as a substantially planar component that includes a button opening 121, securing pin openings 124, and a thumb protrusion 123.

According to some example embodiments, the button opening 121 may be positioned such that the release button 100 may pass through the button opening 121. As further described below, the edge of the button opening 121 may be configured to engage with the release button 100 underneath a locking lip 101 of the release button 100 to maintain the release button 100 in the locked position. However, via sliding movement of the slide lock member 120, the edge of the button opening 121 may disengage from the locking lip 101 and permit the release button 100 to move through the button opening 121 into the unlocked position. According to some example embodiments, the edge of the button opening 121 may have a bevel 122 to facilitate sliding engagement with the locking lip 101 (which may also have a bevel) of the release button 100. As such, according to some example embodiments, the button opening 121 may be larger in area than an area than the release button 100 to permit the release button 100 to pass through the button opening 121, when properly aligned. According to some example embodiments, the button opening 121 may be circular in shape. According to some example embodiments, the button opening 121 may be oval shaped or another elongated shape. Additionally, the button opening 121 may be, according to some example embodiments, closed such that the entire edge of the button opening 121 is disposed internal to the slide lock member 120 and does not extend to an external edge of the slide lock member 120.

The securing pin openings 124 may also be sized to facilitate the ability of the slide lock member 120 to slide relative to the head 20 and the release button 100. In this regard, the securing pin openings 124 may be elongated along the sliding movement direction of the slide lock member 120 such that the securing pin openings 124 have first and second opposite ends. As such, the shape of the securing pin openings 124 may permit the slide lock member 120 to slide relative to the securing pins 130 which are affixed to the head 20 of the wrench 10. According to some example embodiments, the edges of the securing pin openings 124 may include a bevel 125.

The thumb protrusion 123 may, according to some example embodiments, be disposed at a position forward of the button opening 121. The thumb protrusion 123 may be a raised area that may be elongated to operate as a grip for a user's thumb. In this regard, as further described below, the thumb protrusion 123 may be the interface between the user and the slide lock member 120 to provide a means for sliding the slide lock member 120, for example, into a disengaged position against the urging of the slide lock springs 140. According to some example embodiments, the thumb protrusion 123 may be positioned adjacent to the button opening 121, and thus the release button 100, to permit the user to perform a two-step operation of sliding the slide lock member 120 and depressing the release button 100 with the same thumb.

Figure 3B:
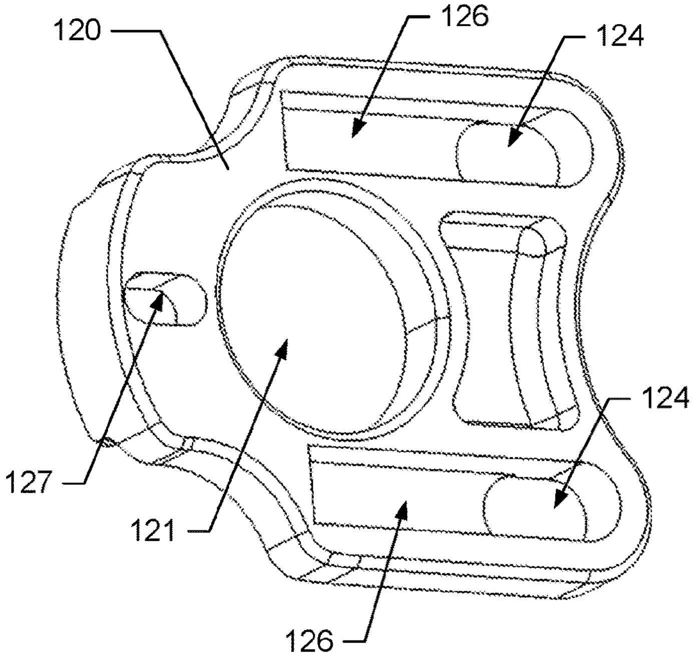
FIG. 3B illustrates a bottom perspective view of a slide lock member according to some example embodiments.

FIG. 3B shows a bottom side of the slide lock member 120. The bottom side of the slide lock member 120 may include features such as the spring slots 126 and the guide slot 127. In this regard, the spring slots 126 may be elongated cavities that are configured to receive the slide lock springs 140. According to some example embodiments, the spring slots 126 may be aligned with the securing pin openings 124 such that the securing pin openings 124 open into the spring slots 126. In this regard, when assembled, a securing pin 130 may pass through a securing pin opening 124 and into the spring slot 126 to permit the slide lock spring 140 to engage directly with the securing pin 130 on one end of the slide lock spring 140 and with wall of the spring slot 126 at the other end of the slide lock spring 140. In this regard, since the securing pin 130 is fixed in position relative to the head 20, the slide lock spring 130 may use the securing pin 130 as leverage to urge the slide lock member 120 into the engaged position.

Additionally, the guide slot 127 may also be an elongate cavity in the bottom surface of the slide lock member 120. As mentioned above, the guide slot 127 may be sized and positioned to engage with the guide protrusion 132 disposed on the top face 200 of the head 20. The engagement between the guide protrusion 132 and the guide slot 127 may operate to limit the movement of slide lock member 120 to a linear sliding movement along the length of the guide slot 127, based on the shape of the guide slot 127.

Additionally, according to some example embodiments, the wrench 10 may also include casings 35. The casings 35 may be configured to rest or on the top face 200 of the head 20 or be inserted into the pin holes 131 to rest on an ledge within the pin holes 131, and the casing 35 may be configured to receive the securing pins 130. In this regard, a securing pin 130 may pass through a channel of the casing 35 to engage with, for example, threading in the pin holes 131. The casings 35 may operate, according to some example embodiments, as a stop or stand-off to control a depth of the securing pins 130 and prevent overtightening of the securing pins 130, which may restrict or even prevent the sliding movement of the slide lock member 120. The casing 35 may rest on the top face 200 of the head 20 or a ledge within the pin hole 131, and the head 133 of the securing pin 130 may be tightened against the casing 35 (rather than the slide lock member 120) and the casing 35 may be sized accordingly.

Further, according to some example embodiments, a casing 35 may include an upper head portion 39 that is wider than a lower body portion 40. According to some example embodiments, the casings 35 may be installed through the slide lock member 120 such that the upper head portion 39 is seated above a bevel 125 or similarly positioned ledge within the securing pin opening 124 (as further described below with respect to FIGS. 3A and 3B). The upper head portion may therefore include a lower external ledge that may engage with the bevel 125 or similarly positioned ledge of the securing pin opening 124. Because the lower body portion 40 of the casing 35 may rest on the backside of the head 20 or a ledge within the pin hole 131, the securing pin 130 may be tightened into the channel of the casing 35 and onto an internal ledge within the channel of the casing 35, with the head 133 being seated on the internal ledge in the upper head portion 39 of the channel in the casing 35. With the securing pin 130 tightened, the slide lock member 120 may be held on the top face 200 of the head 20 by the upper head portion of the casing 35, which in turn is held in place by the securing pin 130. Because the casing 35 is prevented from being tightened onto the slide lock member 120, the slide lock member 120 is free to slide relative to the casing 35 across the top face 200 of the head 20, but cannot be moved away from the top face 200 with a component of movement in a direction perpendicular to the top face 200. In addition to operating as a stop or stand-off for the securing pin 130, the implementation of the casings 35 may also provide added rigidity and support to the securing pins 130 to limit or avoid bending or shifting of the securing pins 130 into improper engagement with the slide lock member 120 when the wrench 10 is subjected to an impact (e.g., when dropped from a high altitude).

Figure 3C:
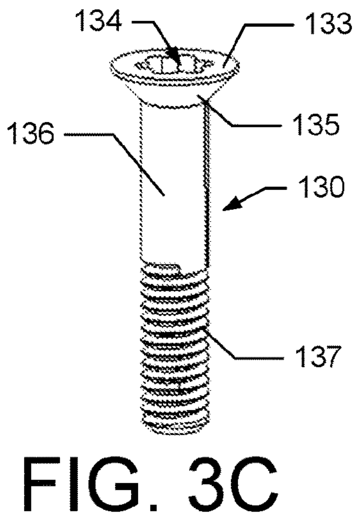
FIG. 3C illustrates a securing pin according to some example embodiments.

FIG. 3C shows an example securing pin 130. As shown, the securing pin 130 may include a head 133, a shank 136, and a thread 137. The thread 137 may be sized to engage with corresponding threading in the pin holes 131 of the head 20. The shank 136 may, according to some example embodiments, be a smooth portion of the securing pin 130 that may be configured to engage with the slide lock spring 140, as described herein. The head 133 may be broader that the shank 136 to permit the head 133 to operate as a catch to secure the slide lock member 120 to the head 20 of the wrench 10. In this regard, the head 133 may have a dimension that is larger than the width of the securing pin opening 124 to prevent the head 133, for example, from passing through the securing pin opening 124. In this regard, to permit the head 133 to sit flush on the top of the slide lock member 120 and still operate as a catch, the head 133 may have a bevel 135 that may correspond to the bevel 125 on the edge of the securing pin opening 124. Additionally, the head 133 may include a drive 134 that facilitates engagement with a tool for tightening or loosening the securing pin 130 in the pin hole 131.

Figure 4A:
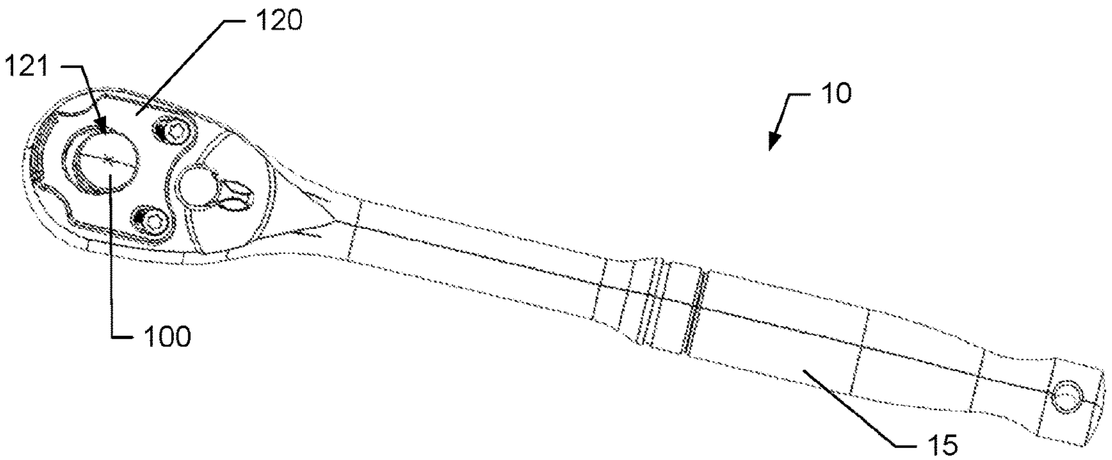
FIG. 4A illustrates a top view of a wrench with a slide lock member in an engaged position according to some example embodiments.
Figure 4B:
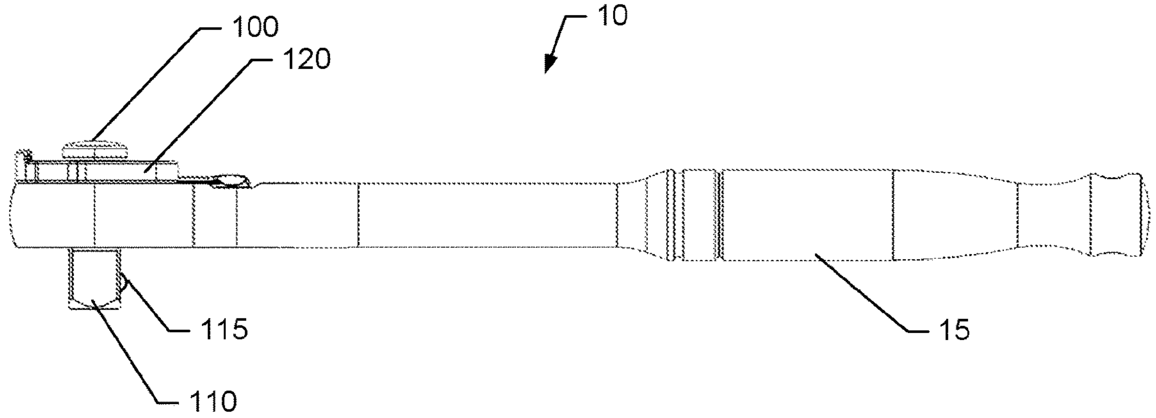
FIG. 4B illustrates a side view of a wrench with a slide lock member in an engaged position according to some example embodiments.

Having described physical and functional characteristics of various components of the wrench 10, a description of the operation of the components will now be provided. In this regard, FIGS. 4A-4D illustrate the configuration of various components of the wrench 10, when the release button 100 is in the locked position and the slide lock member 120 is in the engaged position. With reference to FIGS. 4A and 4B, it can be seen that the slide lock member 120 has been slid forward (away from the handle 15) to the forward-most position, which may be the engaged position. In this regard, as mentioned above, with the slide lock member 120 in the engaged position, the release button 100 is prevented from moving out of the locked position. It can be seen in FIG. 4A, that the rear edge of the button opening 121 is engaged with the release button 100, while a gap exists between the front edge of the button opening 121 and the release button 100. As shown in FIG. 4B, because the release button 100 is in the locked position, the locking member 115 is extended out of the opening the drive tang 110.

Figure 4C:
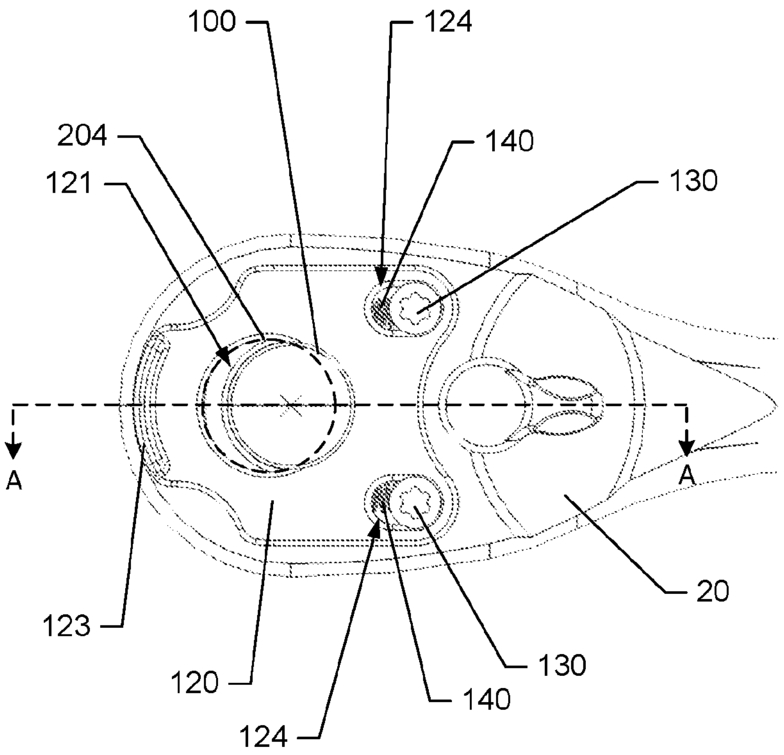
FIG. 4C illustrates a zoomed top view of a head of a wrench with a slide lock member in an engaged position according to some example embodiments.

Now referencing FIG. 4C, a zoomed view of the head 20 is provided with the slide lock member 120 in the engaged position and the release button 100 in the unlocked position. In this regard, the dashed circle 204 indicates the position of the edge of the button opening 121, which is obscured by the locking lip 101 of the release button 100. As shown, due to the locking lip 101 extending away from a center of the release button 100 to create a void, the edge of the button opening 121 can slide under locking lip 101 into the void, thereby blocked the release button 100 form moving into the unlocked position.

Additionally, as shown in FIG. 4C, the securing pin openings 124 are also slid forward due to the slide lock member 120 being in the engaged position. As such, the securing pins 130 are located against the rear edge of the securing pin openings 124. Further, the slide lock springs 140 can be seen though the securing pin openings 124 in positions engaged with the securing pins 130 and urging the slide lock member 120 forward into the engaged position.

Figure 4D:
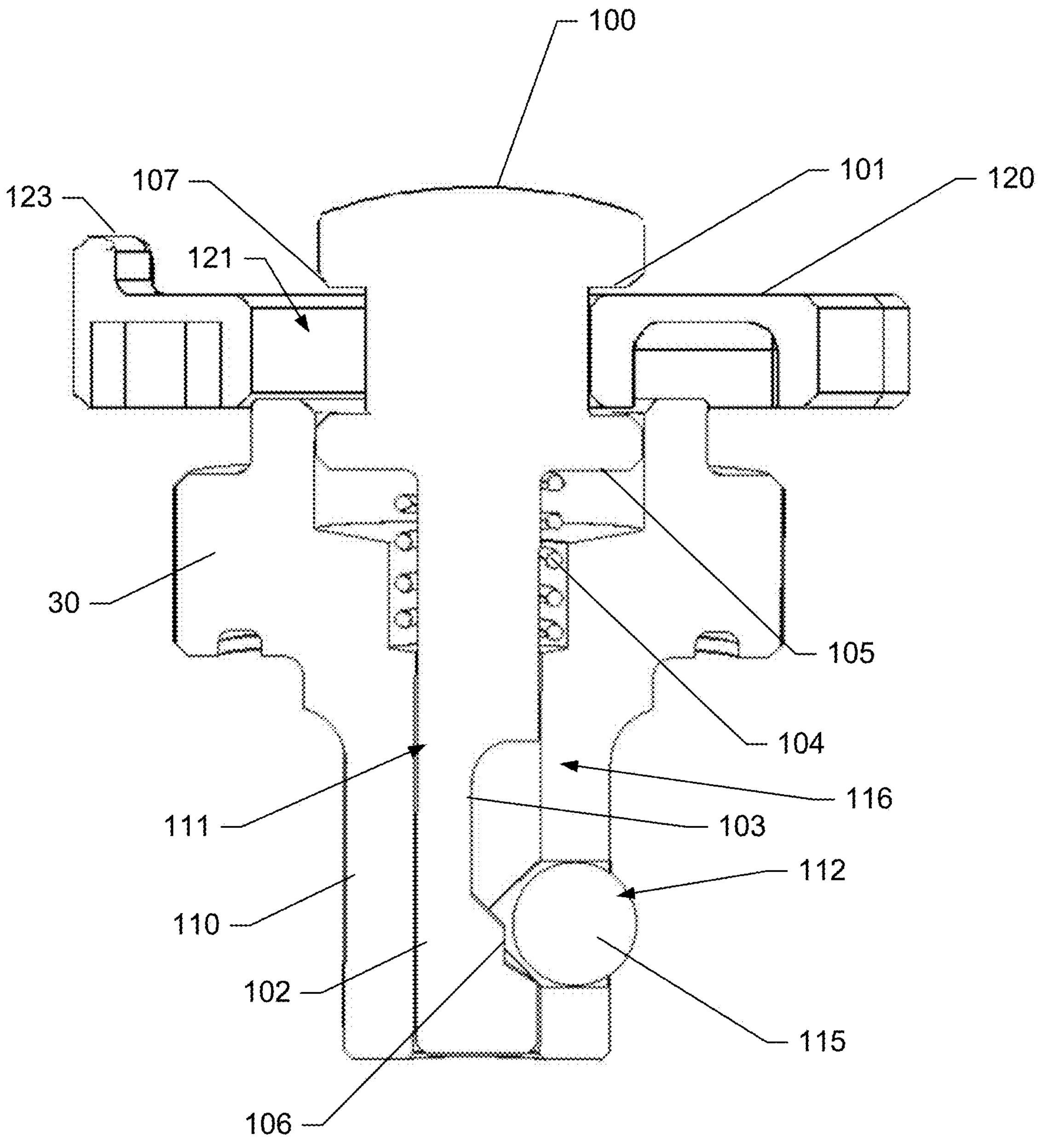
FIG. 4D illustrates a cross-section view taken at A-A of FIG. 4C of select components of a wrench including a slide lock member in an engaged position according to some example embodiments.

Now referencing FIG. 4D, a cross-section view taken at A-A of FIG. 4C of select components of the wrench 10 is shown, with the slide lock member 120 in the engaged position. In this regard, FIG. 4D illustrates the positioning of the slide lock member 120, the release button 100, the post 102, and the locking member 115 relative to the gear 30 and the drive tang 110, when the slide lock member 120 is in the engaged position. The release button 100, the post 102, and the locking member 115 may be components of the lockable detent 116.

The slide lock member 120 is shown with a top surface being slid under the locking lip 101 of the release button 100 (which may have a bevel 107). As such, in this position, the engagement between the locking lip 101 and the edge of the button opening 121 of the slide lock member 120 prevents the release button 100 from being depressed and moving from the locked position to the unlocked position. Additionally, the force provided by the release button spring 104 urges the release button 100 into the locked position due to the engagement of the release button spring 104 between the spring lip 105, from which the post 102 extends, and a ledge within the drive tang cavity 111.

With the release button 100 in the locked position, the post 102 is positioned such that a shallow edge 104 of the post 102 is aligned with the locking member opening 112. As such, the locking member 115, which may be in the form of a spherical bearing, may be forced to extend out of the locking member opening 112 due to the engagement or positioning of the shallow edge 104 of the post 102. As mentioned above, the locking member opening 112 may be smaller than the locking member 115, and therefore, the locking member 115 may extend out of, but may not pass completely through the locking member opening 112.

Figure 5A:
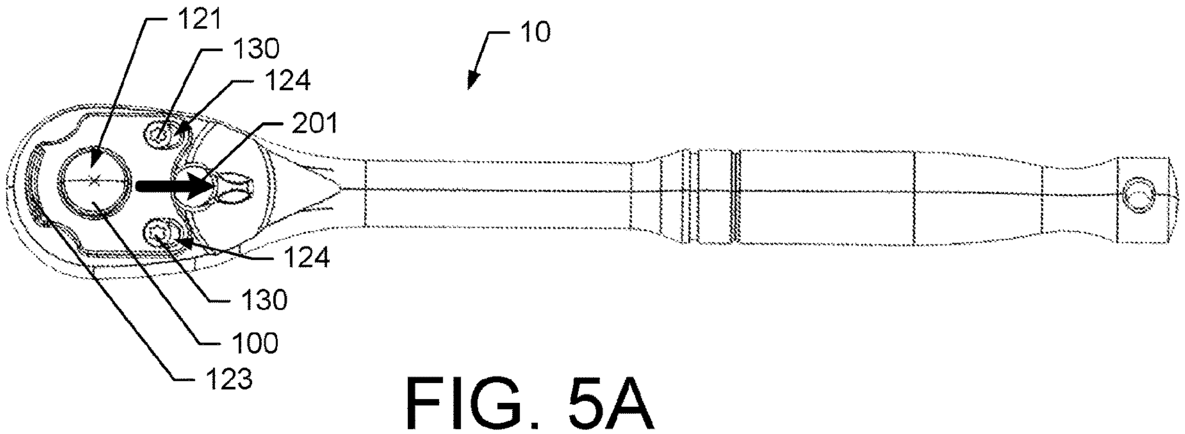
FIG. 5A illustrates a top view of a wrench with a slide lock member in a disengaged position according to some example embodiments.
Figure 5B:
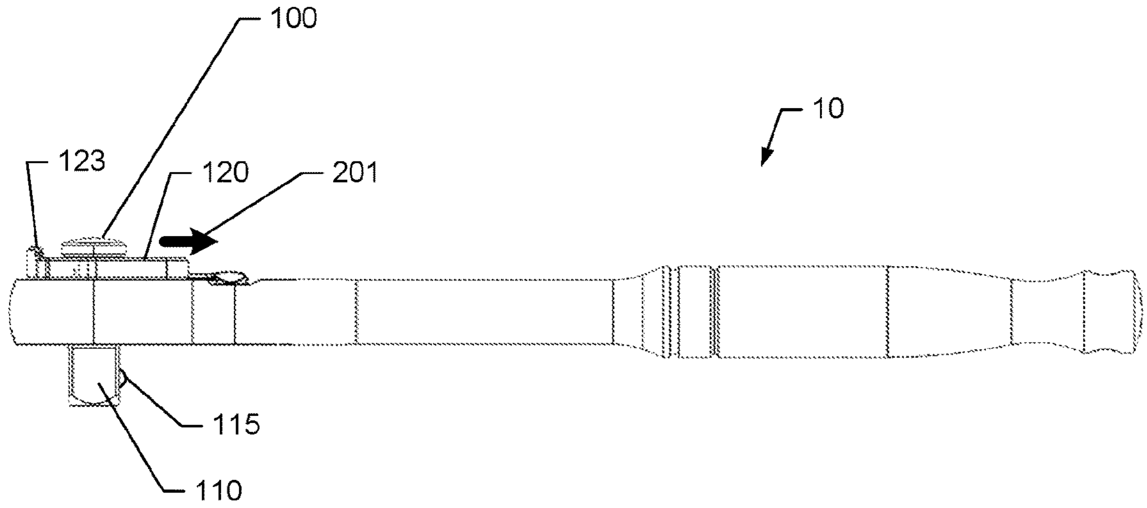
FIG. 5B illustrates a side view of a wrench with a slide lock member in a disengaged position according to some example embodiments.

Now with reference to the FIGS. 5A to 5E, the transition to the slide lock member 120 being in the disengaged position and the release button 100 being in the unlocked position will be described with respect to the various components of the wrench 10. In this regard, FIG. 5A provides a top view and FIG. 5B provides a side view of the wrench 10 shown after the slide lock member 120 has be slid rearward (towards the handle) along the direction 201 (which may be a linear direction) into the disengaged position. The sliding movement of the slide lock member 120 may be constrained to a linear sliding movement by, for example, the shape of the securing pin openings 124 and the guide slot 127. As can be seen in FIG. 5A, the securing pin openings 124 have now shifted into a position where the securing pins 130 are engaged with a forward end of the securing pin openings 124. According to some example embodiments, the engagement between the forward ends of the securing pin openings 124 and the securing pins 130 may operate as a stop to prevent further movement of the slide lock member 120 in the rearward direction. With the slide lock member 120 in the disengaged position, the button opening 121 is aligned with the release button 100 such that the edge of the button opening 121 is not disposed in engagement with the locking lip 101 of the release button 100.

Figure 5C:
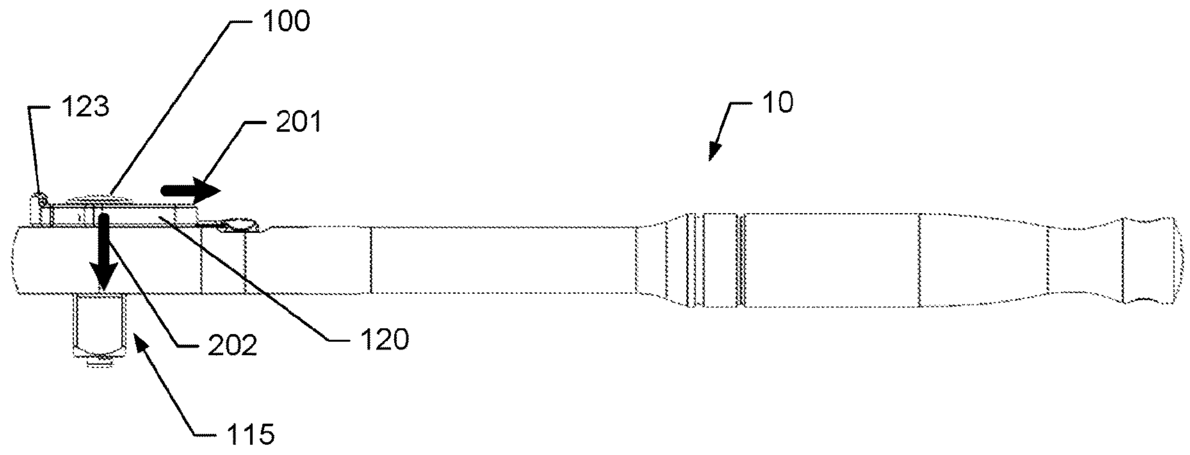
FIG. 5C illustrates a side view of a wrench with a slide lock member in a disengaged position and a release button in an unlocked position according to some example embodiments.

Now with reference to FIG. 5C, the slide lock member 120 has been slid in the direction 201, and now the release button 100 has been depressed and moved in the direction 202, which may be a linear direction. The sliding movement of the slide lock member 120 in the direction 201, according to some example embodiments, may be perpendicular to the movement of the release button 100 in the direction 202. Additionally, the sliding movement of the slide lock member 120 may be a linear motion and the movement of the release button 100, due to being pressed into the top face 200 of the head 20, may also be a linear movement. Because the release button 100 has been depressed and moved into the unlocked position, the locking detent 116 comprising the locking member 115 may permit the locking member 115 to move out of the extended position to permit a work piece to be removed from the drive tang 110.

Figure 5D:
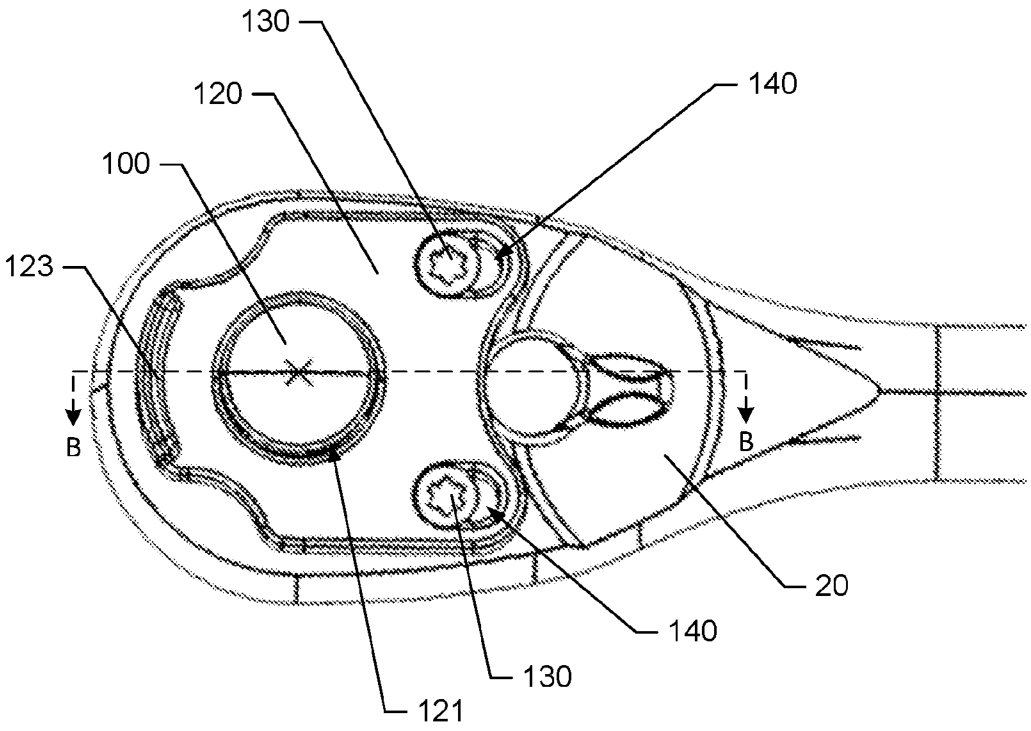
FIG. 5D illustrates a zoomed top view of a head of a wrench with a slide lock member in a disengaged position and the release button in an unlocked position according to some example embodiments.

FIG. 5D provides a zoomed, top view of the head 20 with the slide lock member 120 in the disengaged position and the release button 100 in the unlocked position. In this regard, it can be seen, as mentioned above, that the securing pin openings 124 have shifted rearward and the securing pins 130 are now disposed in an forward position within the securing pin openings 124 and engaged with the forward edges of the securing pin openings 124. As such, the engagement between the securing pins 130 and the forward edges of the securing pin openings 124 may operate as a stop to prevent further movement of the slide lock member 120 in the rearward direction. Additionally, as shown in FIG. 5D, the release button 100 is aligned with the button opening 121. As such, the edge of the button opening 121 is no longer engaged with the locking lip 101 of the release button 100. Therefore, the release button 100 is moveable (i.e., may be depressed) unencumbered by the slide lock member 120.

Figure 5E:
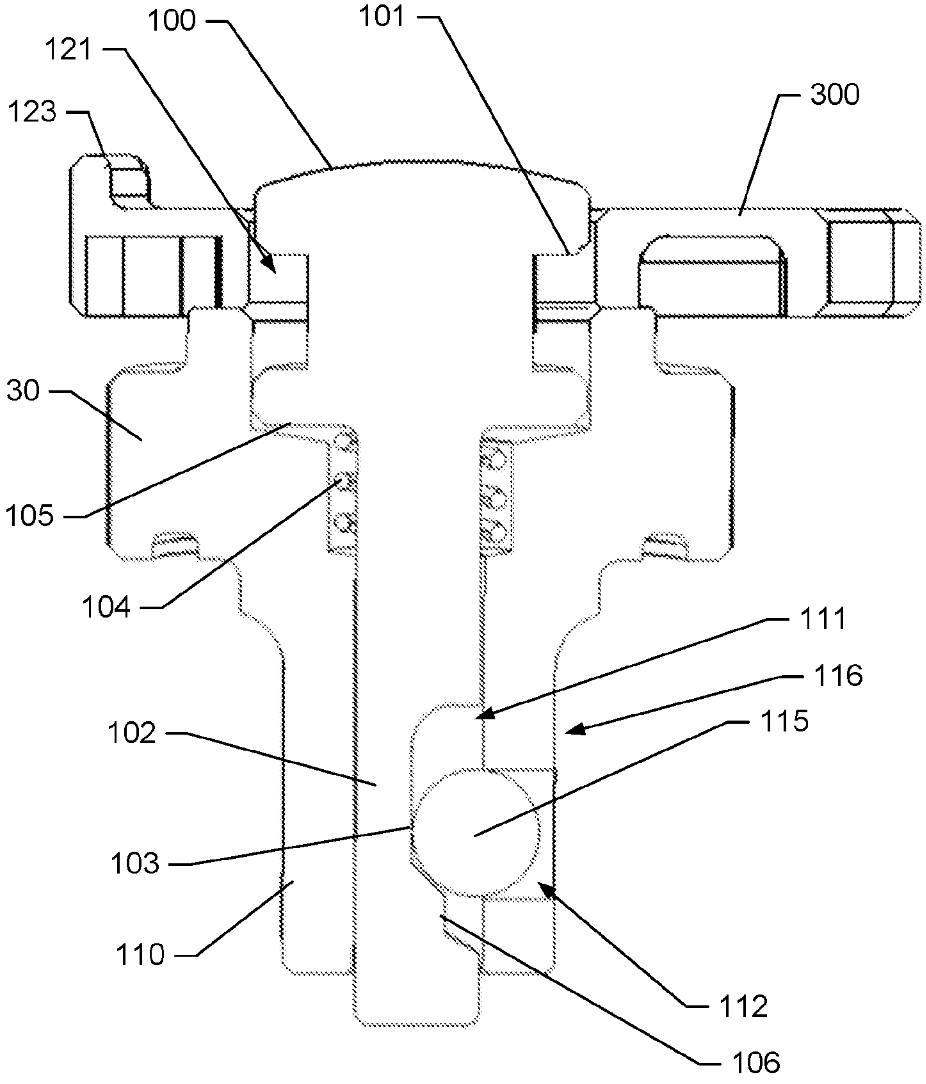
FIG. 5E illustrates a cross-section view taken at B-B of FIG. 5D of select components of a wrench including a slide lock member in a disengaged position according to some example embodiments.

Now referencing FIG. 5E, a cross-section view taken at B-B of FIG. 5D of select components of the wrench 10 is shown, with the slide lock member 120 in the disengaged position and the release button 100 in the unlocked position. In this regard, FIG. 5E illustrates the positioning of the slide lock member 120, the release button 100, the post 102, and the locking member 115 relative to the gear 30 and the drive tang 110, when the slide lock member 120 is in the disengaged position and the release button 100 is in the unlocked position.

The slide lock member 120 is shown with a top surface of the slide lock member 120 being slid rearward such that the locking lip 101 of the release button 100 is no longer in engagement with the locking lip 101 and does not block the release button 100 from being depressed and moved into the unlocked position. As such, in this position, the button opening 121 and the release button 100 are aligned, and, at least a portion of the release button 100 may pass through the button opening 121 into the drive tang cavity 111 when depressed. Further, the release button spring 104 may be compressed between the spring lip 105 and the ledge within the drive tang cavity 111.

With the release button 100 in the unlocked position, the post 102 is positioned such that a deep edge 103 of the post 102 is aligned with the locking member opening 112. As such, the locking member 115, which may be in the form of a spherical bearing, may be permitted to move from the extended position into a retracted position, where, for example, the locking member 115 is completely or substantially disposed within the drive tang cavity 111 and no longer extends through the locking member opening 112. As such, any work piece that was being locked in place due to engagement with the locking member 115, is no longer in engagement with the locking member 115 and may be removed or separated from the drive tang 110.

Figure 6A:
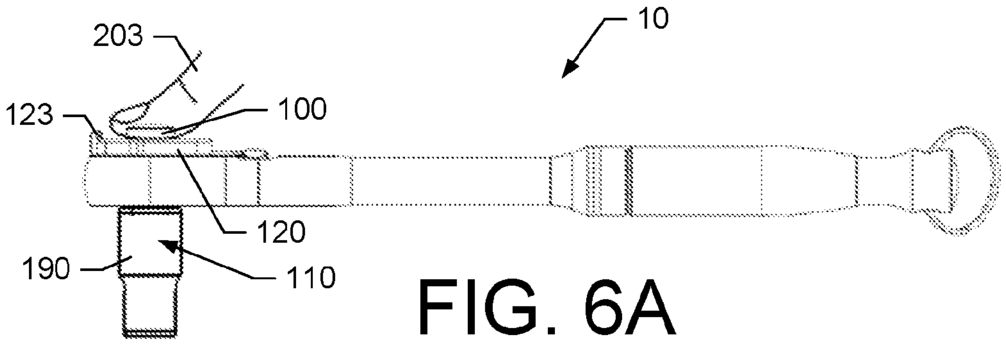
FIGS. 6A to 6C provide an illustration of a two-step disengagement and unlocking process with respect to removal of a socket according to some example embodiments.
Figure 6B:
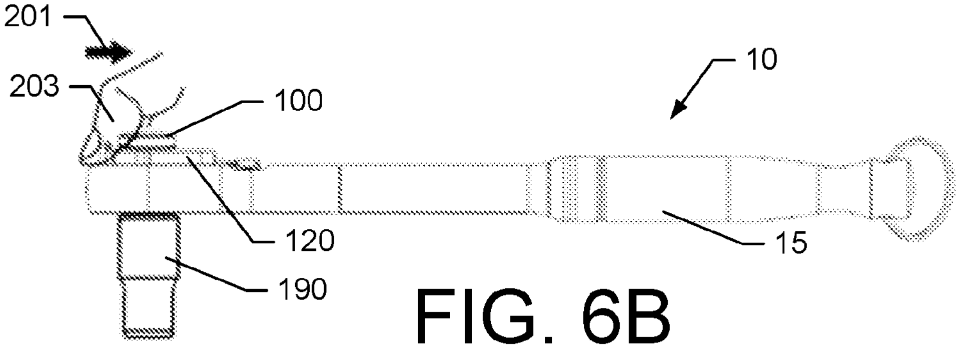
Figure 6C:
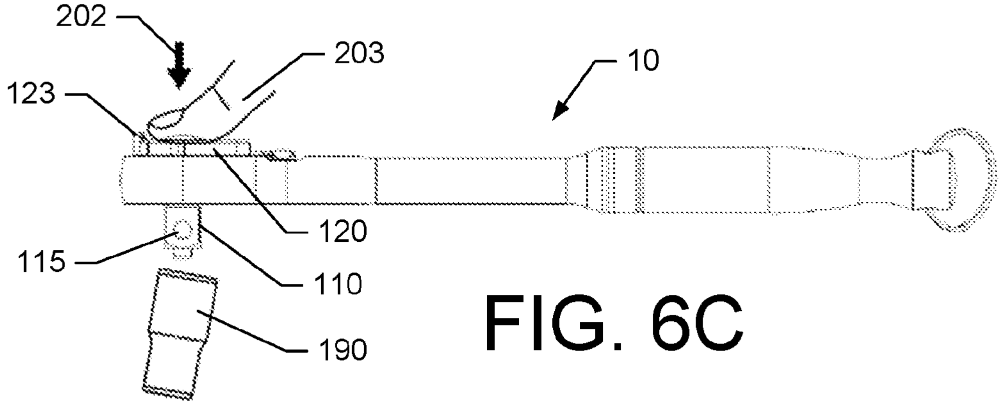

FIGS. 6A to 6C provide illustrations of a user operating the wrench 10, according to some example embodiments. In this regard, with reference to FIG. 6A, a user's thumb 203 is attempting to push or depress the release button 100 with the slide lock member 120 in the engaged position, in an attempt to unlock the socket 190 from the drive tang 110. Because the slide lock member 120 is engaged with the release button 100, the release button 100 cannot be moved into the unlocked position, and therefore the socket 190 remains locked onto the wrench 10.

Now with reference to FIG. 6B, the user's thumb 203 has engaged the thumb protrusion 123 and the user's thumb has pulled the slide lock member 120 rearward, towards the handle 15 in the direction 201. As such, due to, for example, the stops formed by the securing pin openings 124 and the securing pins 130, the slide lock member 120 may be prevented from sliding further rearward, and the release button 100 may be in alignment with the button opening 121. Since the release button 100 has not yet been depressed, the lockable detent 116 is still operating to lock the socket 190 to the drive tang 110.

Now referencing FIG. 6C, while maintaining the slide lock member 120 in the disengaged position (against the urging of the slide lock springs 140), the user's thumb 203 now depresses release button 100, thereby moving the release button 100 from the locked position to the unlocked position. As such, the lockable detent 116 permits the socket 190 to be separated from the drive tang 110 due to, for example, retraction of the locking member 115 into the drive tang cavity 111 and out of engagement with the socket 190.

As such, according to some example embodiments, a ratchet wrench is provided. The ratchet wrench may comprise a head comprising a top face and a bottom face, and a drive tang that extends from the bottom face of the head. In this regard, the drive tang may be shaped to engage a work piece. The ratchet wrench may further comprise a ratcheting mechanism disposed within a head cavity of the head and operably coupled to the drive tang. Additionally, the ratcheting mechanism may be configured to permit the drive tang to rotate relative to the head in a ratcheting rotational direction and prevent the drive tang from rotating relative to the head in a drive rotational direction. The ratchet wrench may further comprise a locking detent operably coupled to the drive tang, and a release button disposed on a top face of the head and configured to control operation of the locking detent. The release button may be movable along a first direction between a locked position, where the locking detent locks the work piece to the drive tang and an unlocked position where the detent permits removal of the work piece from the drive tang. The ratchet wrench may further comprise a slide lock member configured to slide along a second direction between an engaged position and a disengaged position. In this regard, the second direction may be perpendicular to the first direction. Additionally, in the engaged position, the slide lock member may engage with the release button to prevent movement of the release button in the first direction from the locked position to the unlocked position, and, in the disengaged position, the slide lock member may be disengaged from the release button to permit movement of the release button in the first direction to move from the locked position to the unlocked position.

Additionally, the ratchet wrench may further comprise a release button spring configured to urge the release button into the locked position, and a slide lock spring configured to urge the slide lock member into the engaged position. Additionally or alternatively, according to some example embodiments, the release button may comprises a locking lip, and the slide lock member may be positioned under the locking lip of the release button when the slide lock member is in the engaged position. Additionally or alternatively, the locking lip may comprise a beveled edge. Additionally or alternatively, according to some example embodiments, the slide lock member may comprise a button opening that is aligned with the release button when the slide lock member is in the disengaged position such that a portion of the release button moves through the button opening of the slide lock member when the slide lock member is in the disengaged position and the release button is moved from the locked position to the unlocked position. Additionally or alternatively, the slide lock member may comprise a securing pin opening and a guide slot. In this regard, a securing pin may pass through the securing pin opening in the slide lock member and may couple to the top face of the head. Further, the securing pin opening may be sized to permit the slide lock member to slide relative to the securing pin. The slide lock member may comprise a guide protrusion extending from the top face of the head. The guide protrusion may be configured to extend into the guide slot of the slide lock member to guide movement of the slide lock member along the second direction. Additionally or alternatively, the securing pin opening may be an elongate opening having a first end and an second end. Additionally, the engagement between the securing pin and the first end operates as a stop for slide lock member in the disengaged position. Additionally or alternatively, according to some example embodiments, the slide lock member may comprise a spring slot that is aligned with the securing pin, and the ratchet wrench may further comprise a slide lock spring disposed within the spring slot such that an end of the slide lock spring engages with the securing pin. In this regard, the slide lock spring may be configured to urge the slide lock member into the engaged position by applying a force on the securing pin. Additionally or alternatively, according to some example embodiments, the slide lock member may comprise a thumb protrusion configured to be engageable with a thumb of a user to facilitate sliding of slide lock member from the engaged position to the disengage position. Additionally or alternatively, according to some example embodiments, the locking detent may comprise a post operably coupled to the release button such that the post moves with the release button along the first direction, and the post may be disposed within a drive tang cavity in the drive tang. The locking detent may also comprise a locking member disposed within the drive tang cavity and operably coupled to the post such that the movement of the post moves the locking member between an extended position, where a portion of the locking member extends out of an opening in the drive tang to lock the work piece to the drive tang, and a retracted position that permits the work piece to be removed from the drive tang.

According to some example embodiments, a wrench is provided. The wrench may comprise a head comprising a top face and a bottom face, and a drive tang that extends from the bottom face of the head. In this regard, the drive tang may be shaped to engage a work piece. The wrench may further comprise a locking detent operably coupled to the drive tang and a release button disposed on a top face of the head and configured to control operation of the locking detent. The release button may be movable along a first linear direction between a locked position where the locking detent locks the work piece to the drive tang and an unlocked position where the detent permits removal of the work piece from the drive tang. The wrench may further comprise a slide lock member configured to slide along a second linear direction between an engaged position and a disengaged position. In this regard, in the engaged position, the slide lock member may engage with the release button to prevent movement of the release button in the first linear direction from the locked position to the unlocked position, and, in the disengaged position, the slide lock member may be disengaged from the release button to permit movement of the release button in the first linear direction to move from the locked position to the unlocked position.

Additionally or alternatively, according to some example embodiments, the wrench may comprise a release button spring configured to urge the release button into the locked position, and a slide lock spring configured to urge the slide lock member into the engaged position. Additionally or alternatively, according to some example embodiments, the release button comprises a locking lip, and the slide lock member is positioned under the locking lip of the release button when the slide lock member is in the engaged position. Additionally or alternatively, according to some example embodiments, the slide lock member may comprise a button opening that is aligned with the release button when the slide lock member is in the disengaged position such that a portion of the release button moves through the button opening of the slide lock member when the slide lock member is in the disengaged position and the release button is moved from the locked position to the unlocked position. Additionally or alternatively, according to some example embodiments, the slide lock member may comprise a securing pin opening and a guide slot. The wrench may also comprise a securing pin that passes through the securing pin opening in the slide lock member and couples to the top face of the head. The securing pin opening may be sized to permit the slide lock member to slide relative to the securing pin. Further, the wrench may comprise a guide protrusion extending from the top face of the head, and the guide protrusion may be configured to extend into the guide slot of the slide lock member to guide movement of the slide lock member along the second linear direction. Additionally or alternatively, according to some example embodiments, the securing pin opening may be an elongate opening having a first end and an second end, and engagement between the securing pin and the first end operates as a stop for slide lock member in the disengaged position. Additionally or alternatively, the slide lock member may be a spring slot that is aligned with the securing pin. In this regard, the wrench further comprises a slide lock spring disposed within the spring slot such that an end of the slide lock spring engages with the securing pin, and the slide lock spring is configured to urge the slide lock member into the engaged position by applying a force on the securing pin.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A ratchet wrench comprising:

a head comprising a top face and a bottom face;

a drive tang that extends from the bottom face of the head, the drive tang being shaped to engage a work piece;

a ratcheting mechanism disposed within a head cavity of the head and operably coupled to the drive tang, the ratcheting mechanism being configured to permit the drive tang to rotate relative to the head in a ratcheting rotational direction and prevent the drive tang from rotating relative to the head in a drive rotational direction;

a locking detent operably coupled to the drive tang;

a release button disposed on a top face of the head and configured to control operation of the locking detent, the release button being movable along a first direction between a locked position where the locking detent locks the work piece to the drive tang and an unlocked position where the detent permits removal of the work piece from the drive tang; and a slide lock member configured to slide along a second direction between an engaged position and a disengaged position, the second direction being perpendicular to the first direction;

wherein, in the engaged position, the slide lock member engages with the release button to prevent movement of the release button in the first direction from the locked position to the unlocked position; and wherein, in the disengaged position, the slide lock member is disengaged from the release button to permit movement of the release button in the first direction to move from the locked position to the unlocked position;

wherein the slide lock member comprises a securing pin opening and a guide slot; and wherein the ratchet wrench further comprises:

a securing pin that passes through the securing pin opening in the slide lock member and couples to the top face of the head, the securing pin opening being sized to permit the slide lock member to slide relative to the securing pin;

a guide protrusion extending from the top face of the head, the guide protrusion being configured to extend into the guide slot of the slide lock member to guide movement of the slide lock member along the second direction.

2. The ratchet wrench of claim 1 further comprising:

a release button spring configured to urge the release button into the locked position; and a slide lock spring configured to urge the slide lock member into the engaged position.

3. The ratchet wrench of claim 1 wherein the release button comprises a locking lip; and wherein the slide lock member is positioned under the locking lip of the release button when the slide lock member is in the engaged position.

4. The ratchet wrench of claim 3, wherein the locking lip comprises a beveled edge.

5. The ratchet wrench of claim 3, wherein the slide lock member comprises a button opening that is aligned with the release button when the slide lock member is in the disengaged position such that a portion of the release button moves through the button opening of the slide lock member when the slide lock member is in the disengaged position and the release button is moved from the locked position to the unlocked position.

6. The ratchet wrench of claim 1 wherein the securing pin opening is an elongate opening having a first end and an second end; and wherein engagement between the securing pin and the first end operates as a stop for slide lock member in the disengaged position.

7. The ratchet wrench of claim 1, wherein the slide lock member comprises a spring slot that is aligned with the securing pin; and wherein the ratchet wrench further comprises a slide lock spring disposed within the spring slot such that an end of the slide lock spring engages with the securing pin;

wherein the slide lock spring is configured to urge the slide lock member into the engaged position by applying a force on the securing pin.

8. The ratchet wrench of claim 1, wherein the slide lock member comprises a thumb protrusion configured to be engageable with a thumb of a user to facilitate sliding of slide lock member from the engaged position to the disengage position.

9. The ratchet wrench of claim 1, wherein the locking detent comprises:

a post operably coupled to the release button such that the post moves with the release button along the first direction, the post being disposed within a drive tang cavity in the drive tang;

a locking member disposed within the drive tang cavity and operably coupled to the post such that the movement of the post moves the locking member between an extended position, where a portion of the locking member extends out of an opening in the drive tang to lock the work piece to the drive tang, and a retracted position that permits the work piece to be removed from the drive tang.

10. A wrench comprising:

a head comprising a top face and a bottom face;

a drive tang that extends from the bottom face of the head, the drive tang being shaped to engage a work piece;

a locking detent operably coupled to the drive tang;

a release button disposed on a top face of the head and configured to control operation of the locking detent, the release button being movable along a first linear direction between a locked position where the locking detent locks the work piece to the drive tang and an unlocked position where the detent permits removal of the work piece from the drive tang; and a slide lock member configured to slide along a second linear direction between an engaged position and a disengaged position, the slide lock member comprising a button opening positioned such that the release button is able to pass through the button opening;

wherein, in the engaged position, the slide lock member engages with the release button to prevent movement of the release button in the first linear direction from the locked position to the unlocked position; and wherein, in the disengaged position, the slide lock member is disengaged from the release button to permit movement of the release button in the first linear direction to move from the locked position to the unlocked position;

wherein the slide lock member comprises a thumb protrusion that is an elongated raised area that operates as a grip for a user's thumb;

wherein the thumb protrusion is positioned adjacent to the button opening and the release button to permit the user to perform a two-step operation of sliding the slide lock member and depressing the release button with a same thumb of the user.

11. The wrench of claim 10 further comprising:

a release button spring configured to urge the release button into the locked position; and a slide lock spring configured to urge the slide lock member into the engaged position.

12. The wrench of claim 10 wherein the release button comprises a locking lip; and wherein the slide lock member is positioned under the locking lip of the release button when the slide lock member is in the engaged position.

13. The wrench of claim 12, wherein the button opening that is aligned with the release button when the slide lock member is in the disengaged position such that a portion of the release button moves through the button opening of the slide lock member when the slide lock member is in the disengaged position and the release button is moved from the locked position to the unlocked position.

14. The wrench of claim 10, wherein the slide lock member comprises a securing pin opening and a guide slot; and wherein the wrench further comprises:

a securing pin that passes through the securing pin opening in the slide lock member and couples to the top face of the head, the securing pin opening being sized to permit the slide lock member to slide relative to the securing pin;

a guide protrusion extending from the top face of the head, the guide protrusion being configured to extend into the guide slot of the slide lock member to guide movement of the slide lock member along the second linear direction.

15. The wrench of claim 14 wherein the securing pin opening is an elongate opening having a first end and a second end; and wherein engagement between the securing pin and the first end operates as a stop for slide lock member in the disengaged position.

16. The wrench of claim 14, wherein the slide lock member comprises a spring slot that is aligned with the securing pin; and wherein the wrench further comprises a slide lock spring disposed within the spring slot such that an end of the slide lock spring engages with the securing pin;

wherein the slide lock spring is configured to urge the slide lock member into the engaged position by applying a force on the securing pin.

* * * * *